(12) United States Patent
Bauer et al.

(10) Patent No.: US 7,563,984 B2
(45) Date of Patent: Jul. 21, 2009

(54) DEVICE FOR CONNECTING THE SHEATH OF AN ELECTRIC WINDING TO A GROUND CONDUCTOR AND A MAGLEV TRAIN EQUIPPED THEREWITH

(75) Inventors: Marcus Bauer, Freising (DE); Xiufei Liu, Munich (DE); Friedrich Loeser, Riemerling (DE)

(73) Assignee: Thyssenkrupp Transrapid GmbH, Kassel (DE)

( * ) Notice: Subject to any disclaimer, the term of this patent is extended or adjusted under 35 U.S.C. 154(b) by 0 days.

(21) Appl. No.: 10/593,370

(22) PCT Filed: Mar. 22, 2005

(86) PCT No.: PCT/DE2005/000529

§ 371 (c)(1),
(2), (4) Date: Apr. 27, 2007

(87) PCT Pub. No.: WO2005/096479

PCT Pub. Date: Oct. 13, 2005

(65) Prior Publication Data

US 2007/0281517 A1   Dec. 6, 2007

(30) Foreign Application Priority Data

Mar. 25, 2004   (DE) .................. 10 2004 015 096

(51) Int. Cl.
*H02G 15/08* (2006.01)
(52) U.S. Cl. ........................................... 174/78
(58) Field of Classification Search .......... 174/75 C, 174/78, 84 C; 310/12, 13
See application file for complete search history.

(56) References Cited

U.S. PATENT DOCUMENTS

| 963,035 | A | * | 7/1910 | Cope ........................... 439/874 |
| 2,135,937 | A |  | 11/1938 | Gordon |
| 4,360,748 | A |  | 11/1982 | Raschbichler et al. |
| 5,053,654 | A |  | 10/1991 | Augsburger et al. |
| 5,209,964 | A |  | 5/1993 | Nakagawa |
| 5,767,449 | A | * | 6/1998 | Gronowicz, Jr. ............. 174/78 |
| 6,124,550 | A |  | 9/2000 | Funken et al. |
| 2007/0216233 | A1 | * | 9/2007 | Braun et al. .................. 310/12 |

FOREIGN PATENT DOCUMENTS

| DE | 30 06 382 | 8/1981 |
| DE | 84 105 00 | 7/1984 |
| DE | 39 17 058 | 11/1990 |
| DE | 41 32 985 | 5/1992 |
| DE | 196 20 222 | 3/1997 |
| DE | 198 33 418 | 6/1999 |
| DE | 298 80 161 | 12/2000 |
| DE | 201 01 302 | 5/2001 |
| GB | 2 331 869 | 6/1999 |

* cited by examiner

*Primary Examiner*—Chau N Nguyen
(74) *Attorney, Agent, or Firm*—Michael J. Striker

(57) ABSTRACT

A device is described for connecting an, at least in part, electrically conductive sheath (21) of an alternating current winding (4), which is placed into the grooves (2) of a long-stator (1), to a ground conductor (17). The device comprises a sleeve (11) partly enclosing the winding (4) and being provided with a connecting element (16) for said ground conductor (17). According to the invention the sleeve (11), the ground conductor (17) an the connecting element (16) are exclusively made of a non-corrosive metal (FIG. 6).

8 Claims, 6 Drawing Sheets

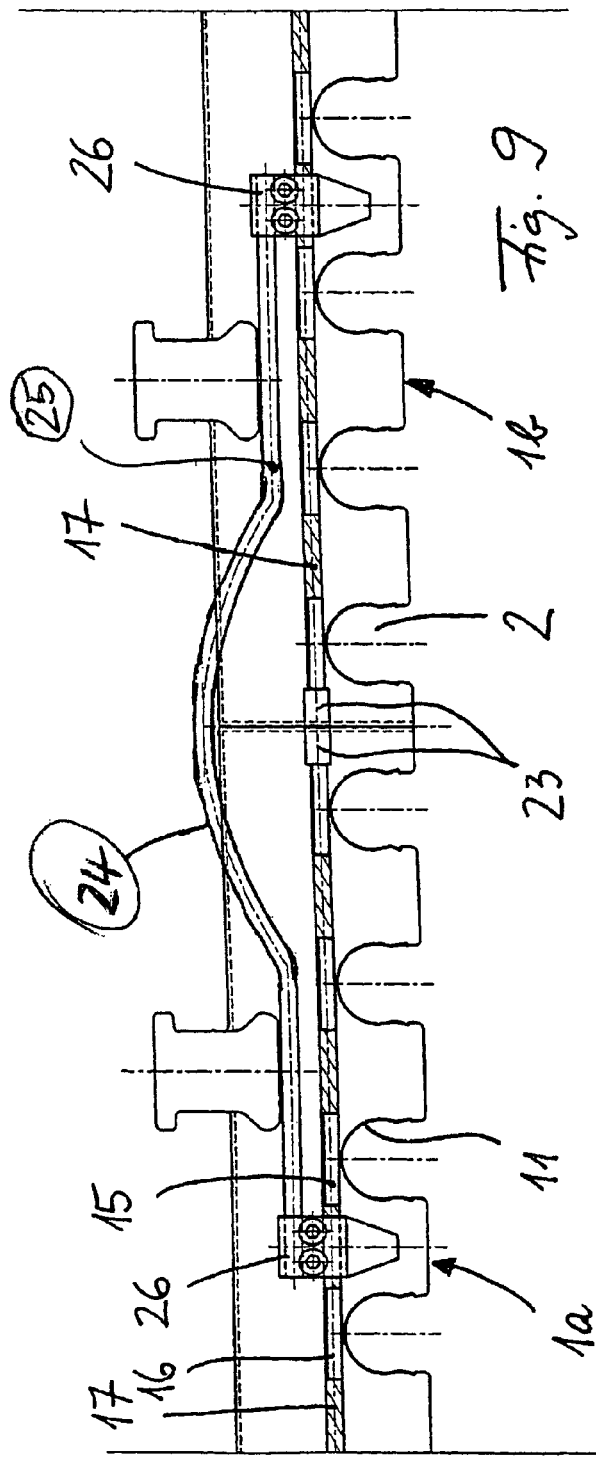
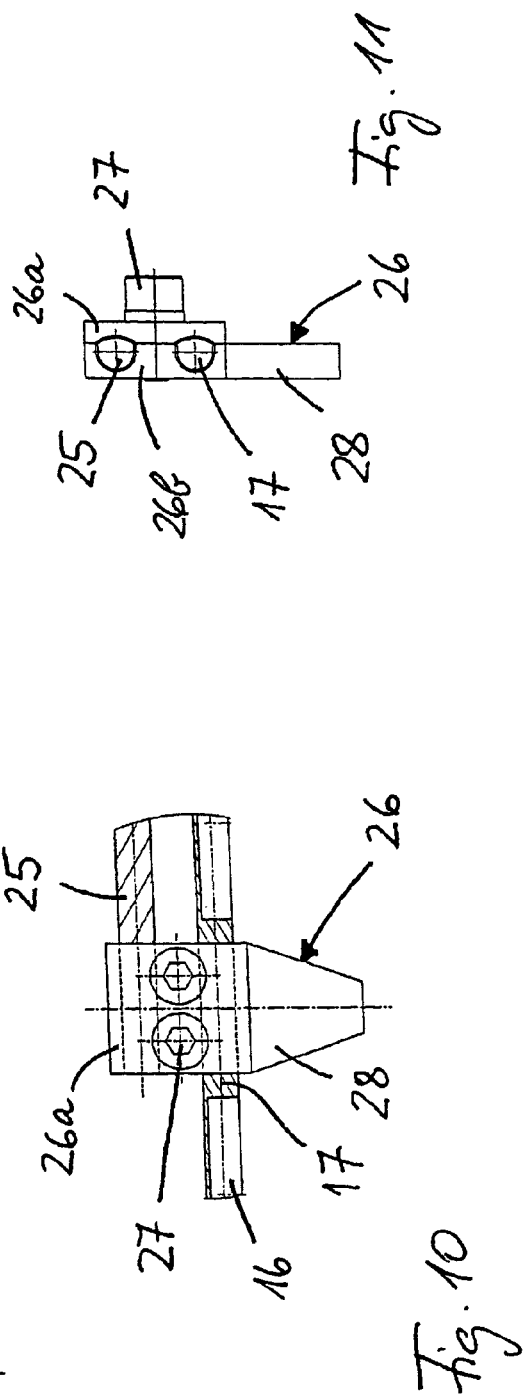
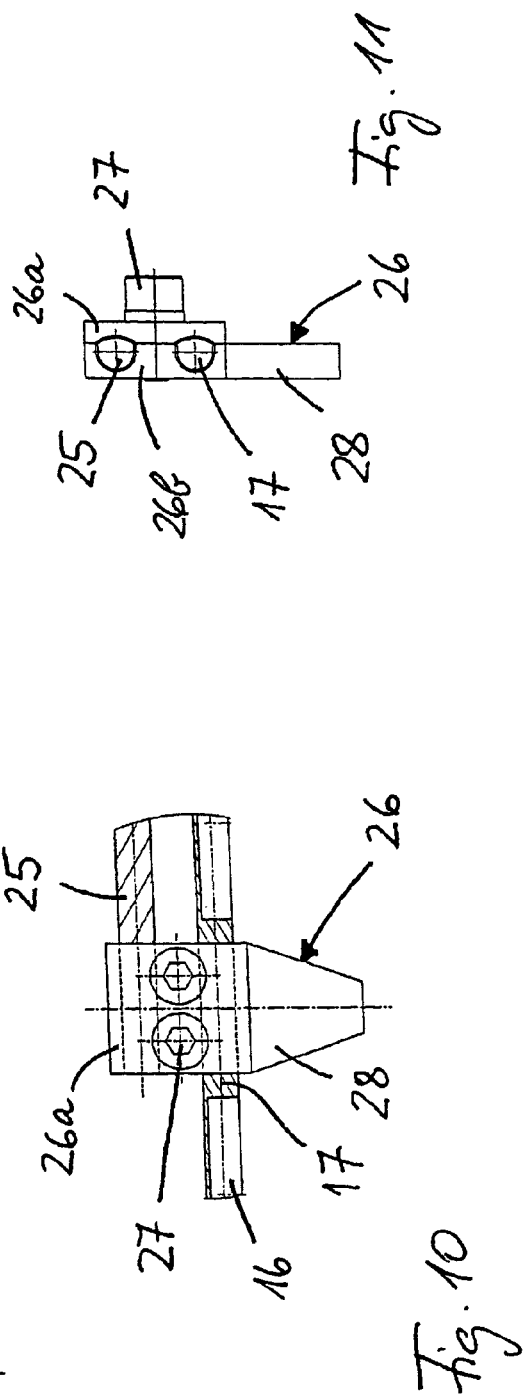

DEVICE FOR CONNECTING THE SHEATH OF AN ELECTRIC WINDING TO A GROUND CONDUCTOR AND A MAGLEV TRAIN EQUIPPED THEREWITH

BACKGROUND OF THE INVENTION

The invention relates to a device for connecting the sheath of an electric winding to a ground conductor and to a magnetic levitation railway (maglev train) equipped therewith.

With magnetic levitation railways having long-stator linear motors, a long-stator is provided alongside a guideway, into the grooves of which a three-phase alternate current winding is inserted, which for example consists of a copper or aluminum cable and an insulating layer surrounding it. Since differences in voltage occur due to inductive effects in normal operation along the windings and because currents thereby caused may flow, it is known (DE 30 06 382 C29) to provide the windings with an additional outer sheath made of an electrically isolating plastic material being made at least partly electrically conductive with carbon black, graphite, a copper mesh or otherwise in order to discharge these and other electric currents, to ensure hazard protection on contact and for other reasons, and to connect this sheath in the area of each groove to a ground conductor extending alongside the long-stator. To ensure that small transitional resistances are obtained between the sheath and the ground conductor, it is furthermore well known practice (DE 196 20 222 C2) to connect the winding sheath to the ground conductor by means of devices which consist of sleeves partly surrounding the windings, are inserted into the grooves of the long-stator and comprise connecting elements for the ground conductor. Thereby it is intended on the one hand to establish a comparably large contact between the sheath and the sleeves, while the connecting elements on the other hand are intended to allow for a simple connection to the ground conductor. For avoidance of corrosion, the sleeves and the connecting elements are made of stainless steel.

The ground conductors hitherto consist of a well conducting material, e.g. copper. They are connected at optional points and optionally frequently to the ground potential and provided with a conductive plastic sheath like the alternating current windings to provide corrosion and contact protection.

In practical use of magnetic levitation railways, two essential weak points have shown up in the described devices. On the one hand it was found out that the plastic sheath of the ground conductor was scorched through at numerous points after a longer period of operation. Such scorched points indicating thermal overloads are not tolerable. On the other hand, fire and/or carbonization points also occur in the sheath of the long-stator winding itself, whereby the sheath gradually becomes brittle and begins to dissolve. This is not tolerable either.

SUMMARY OF THE INVENTION

In view thereof, the technical problem underlying the present invention is to configure the device of the species mentioned hereinabove in such a manner that areas of scorching and carbonization are avoided. Moreover, a magnetic levitation railway equipped with such a device is to be proposed.

The invention proceeds from the thought that undesirably high transition resistances and, thereby, thermal peak loads may occur due to the small transition cross-sections of the connecting elements when electrical currents are transferred from the sleeves to the ground cable which peak loads exceed the thermal load-bearing capacity of the plastic insulation of the ground conductor and therefore cause scorching wherever they are the greatest. However, if corrosion-resistant ground conductors made of metal are used, the danger of thermal overloads is largely precluded.

In accordance with a particularly preferred embodiment example of the present invention, the sleeves are provided with nominal (desired) contact points, e.g. inwardly protruding beads. Thus it is accomplished to create defined contact points between the sheath of the alternating current winding and the sleeve, thereby avoiding that the electric current flows off through accidentally formed point-like contact points and achieves so high electric current densities that the sheath layer of the windings is damaged. It is assumed here that up to now despite of the large-area sleeve transitions of electric current occur only where the sleeve accidentally lies firmly at the sheath depending on the position and/or curvature of the winding.

BRIEF DESCRIPTION OF THE DRAWINGS

The invention is explained in greater detail as set forth below by an embodiment, based on the drawings enclosed hereto which are drawn in different scales, wherein:

FIG. 9 shows a partial and a schematic side view of a long-stator in the area of a switch and with a special embodiment of the device according to the present invention in the switch area, and FIG. 10 and FIG. 11 each show a magnified front and side view of a clamping connector of the device according to FIG. 9.

DETAILED DESCRIPTION OF THE PREFERRED EMBODIMENTS

Figure 1:
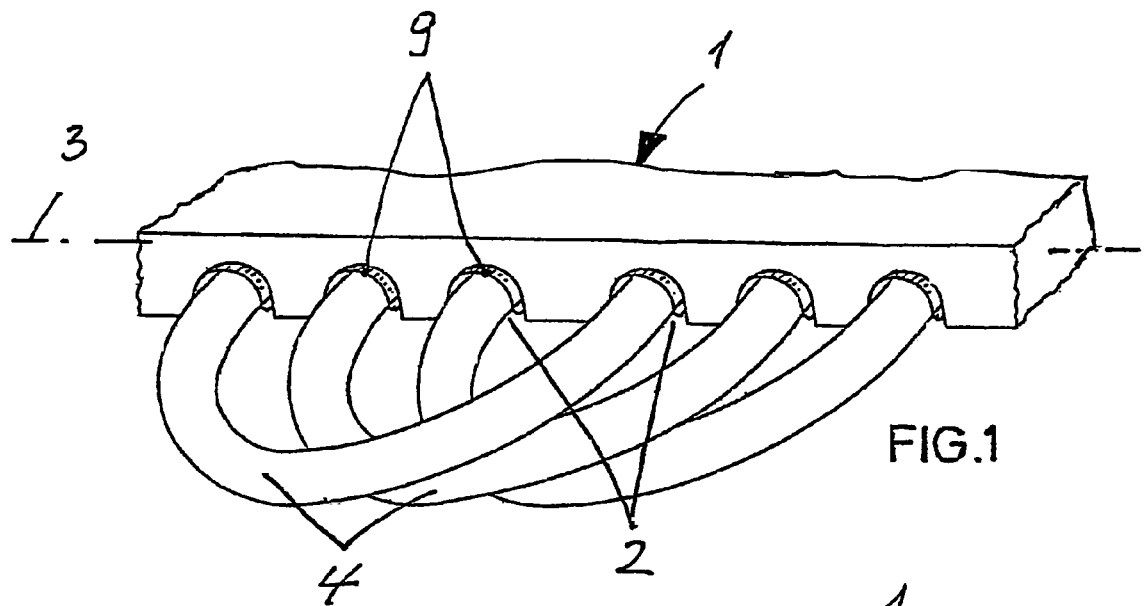
FIG. 1 schematically shows a perspective view of the long-stator of a linear motor with a three-phase alternating current winding for a magnetic levitation railway.

FIG. 1 shows a portion of a long-stator 1 of a linear motor for a magnetic levitation railway. Within preselected distances, the long-stator 1 has grooves 2 which are continuously configured in a direction transverse to its longitudinal axis 3 in order to accommodate a three-phase alternating current winding 4. For example, a reaction part of a magnetic levitation vehicle provided with a carrying magnets is guided at the underside of the long-stator 1 in the direction of the longitudinal axis 3. The general set-up and the mode of operation of such a long-stator linear motor are widely known to those skilled in the art, e.g. from the printed publication De 39 17 058 C1, which for the sake of avoiding repetitions is hereby made an integral part of the present disclosure.

Figure 2:
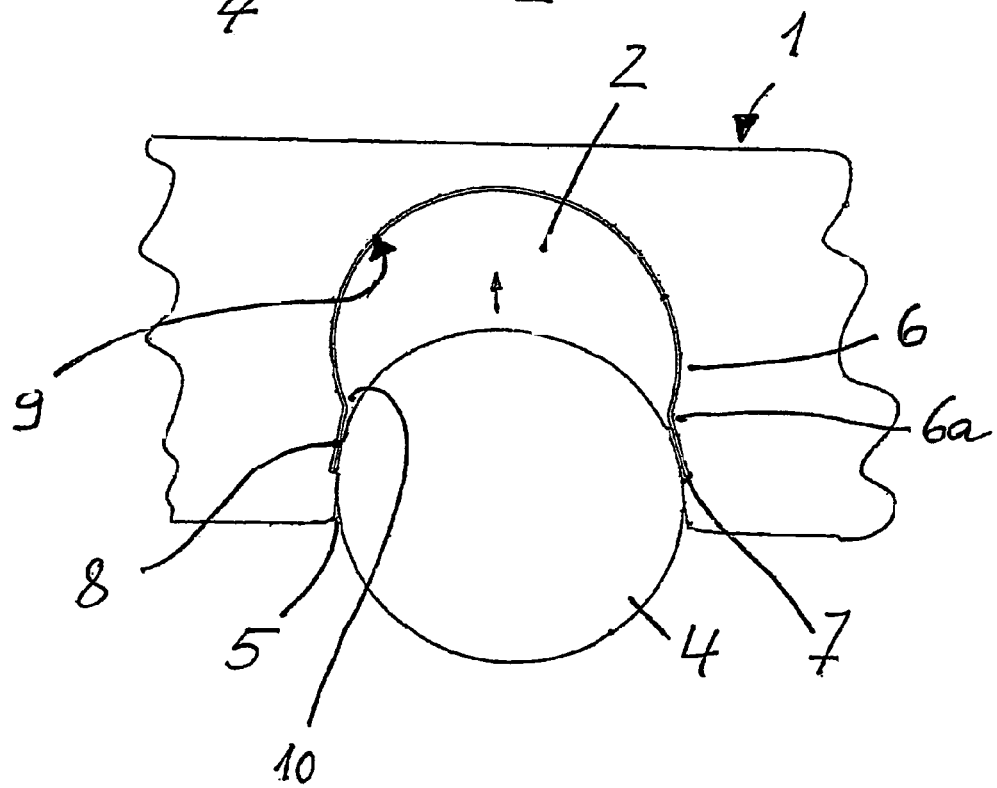
FIG. 2 shows a front view of the long-stator according to FIG. 1 in the area of a groove during insertion of the winding.

According to FIG. 2, the grooves 2 each are opened outwardly and/or downwardly through slots 5 and confined by walls 6 which have inwardly protruding projections 6a that stand opposite to each other and which have distances to each other at a narrowest point that are smaller than corresponds to the outer diameter of the winding 4.

As is furthermore shown on FIG. 2 the parts of wall 6 lying on both sides of the grooves 2 are provided with a support shoulder 7 each near the opening slot 5. Two lower longitudinal edges 8 of a sleeve 9 are supported on these support shoulders 7, said sleeve being comprised of a thin stainless steel metal sheet shaped according to wall 6. The sleeve 9 is preferably resilient to allow it to be pressed in the direction of an arrow shown in FIG. 2 into the groove 2 until the longitudinal edges 8 snap into place behind the support shoulders 7. Thereby, the sleeve 9 is then fixed in groove 2 in non-turnable status and secured against falling-out.

At those places where the walls 6 have their projections 6*a*, the sleeve 9 is shaped accordingly so that the groove 2 has a constriction 10 after the sleeve 9 has been inserted.

Since the windings 4 can be slightly deformed elastically, they can also be pressed into the grooves 2 in the direction of the drawn-in arrow after the sleeves 9 have been inserted until they elastically snap into place behind the constrictions 10 and are thereby secured against falling-out.

The configuration of the grooves 2 and sleeves 9 is widely known to those skilled in the art, e.g. from the printed publication De 196 20 222 C1, which for the sake of avoiding repetitions is hereby made an integral part of the present disclosure.

Figure 3:
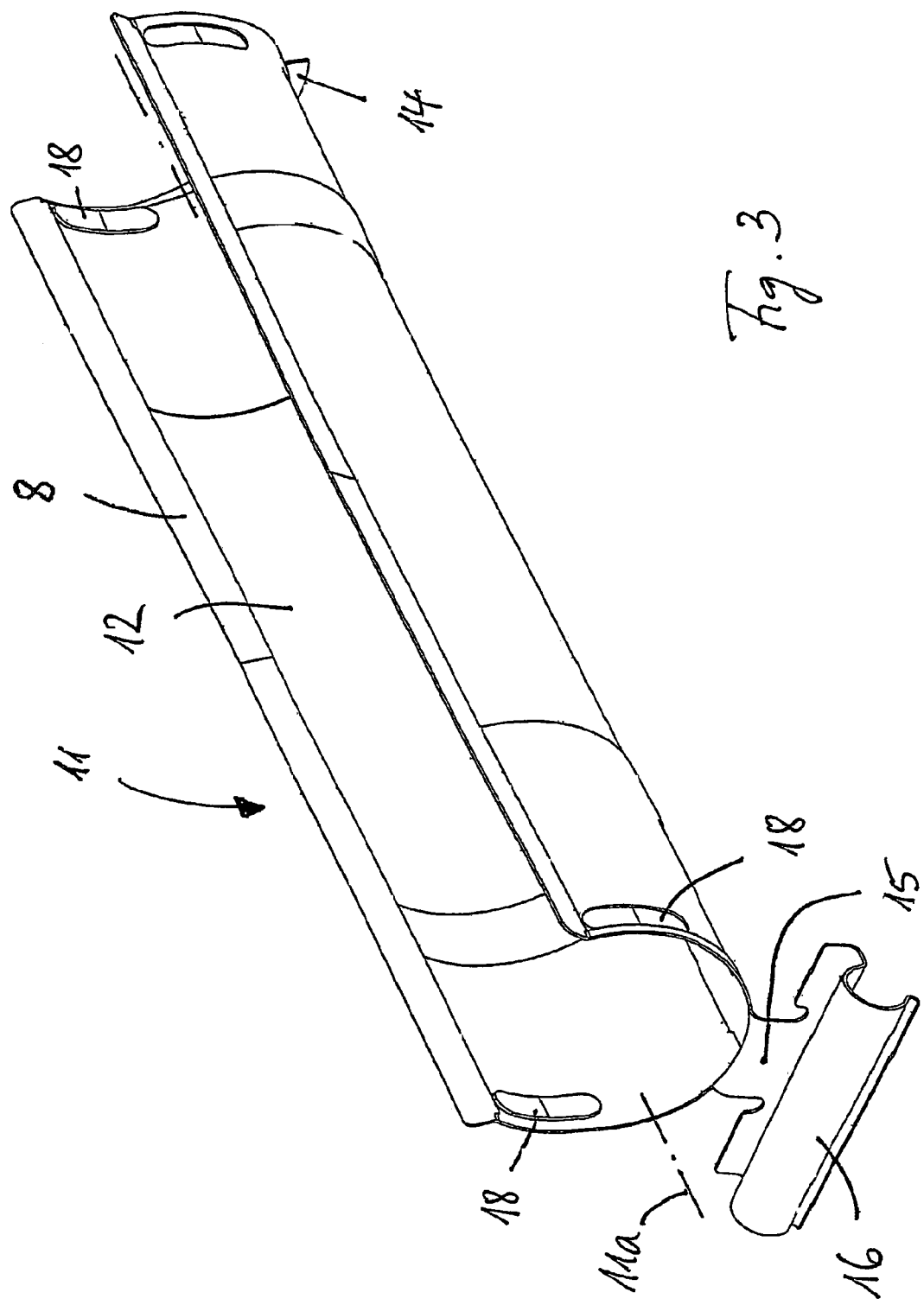
FIG. 3 shows a perspective view of a sleeve in accordance with the present invention.
Figure 4:
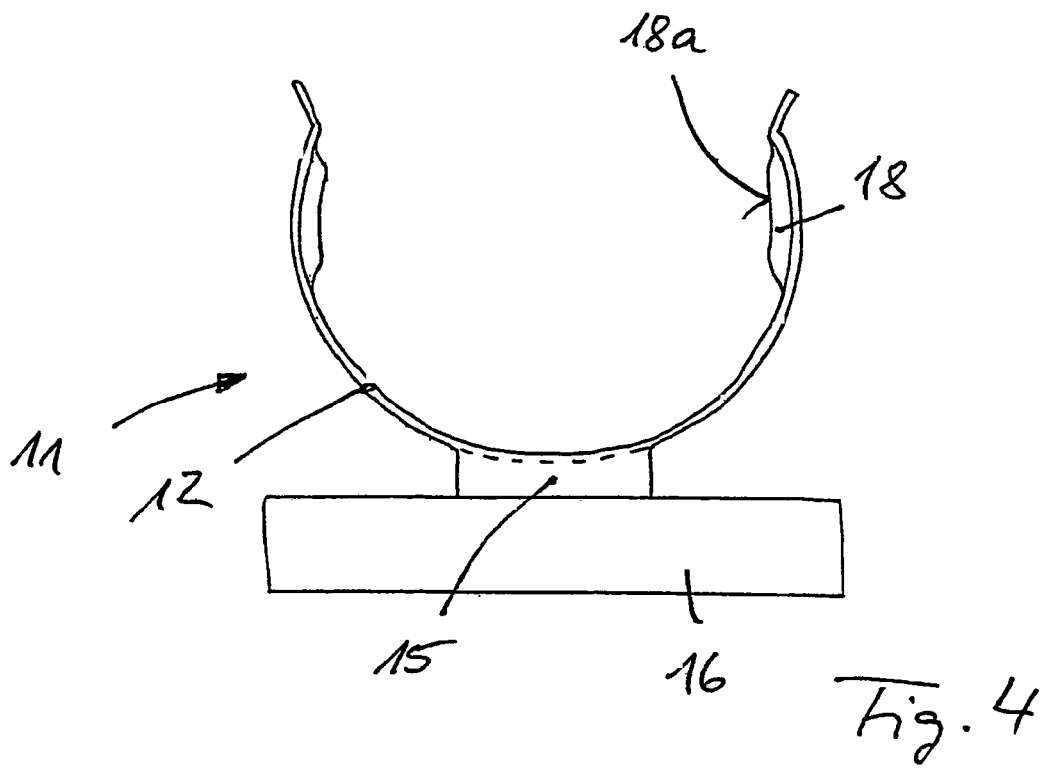
FIG. 4 and FIG. 5 each show a front view and a cross-section of the sleeve according to FIG. 3.
Figure 5:
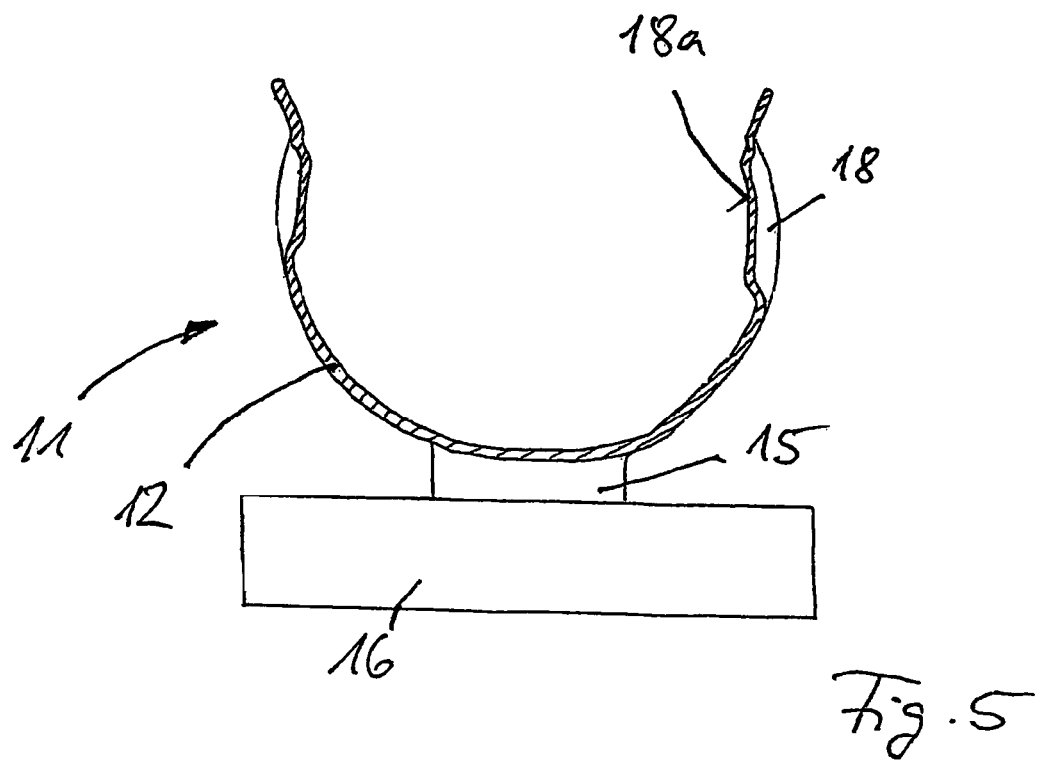
Figure 6:
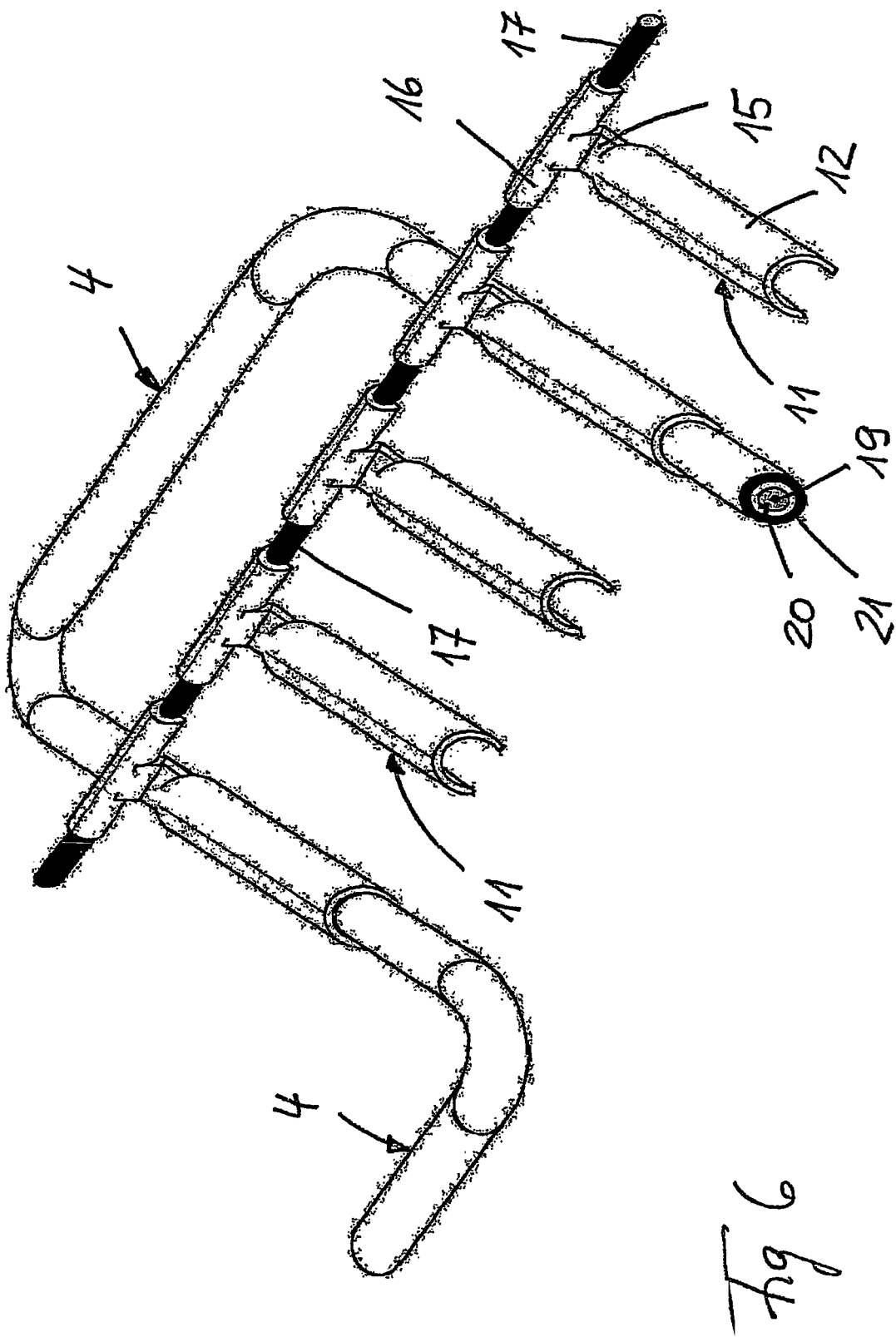
FIG. 6 shows a perspective view of the winding according to FIG. 1 without a long-stator after insertion into the sleeve according to the present invention together with a ground conductor.

The details of the sleeve 11 configured in accordance with the present invention particularly result from FIGS. 3 to 5 in which the sleeve 11 is shown in a position turned by 180° around its longitudinal axis ha as compared with FIG. 2. Accordingly, the sleeve 11 comprises a shell 12 with a contour which mainly follows the contour of a cylindrical surface and which is so large that it encircles the winding 4 in a mounted condition by a bit more than a half. The length of the shell 12 in the direction of the longitudinal axis 11*a* mainly corresponds to the length of groove 2 so that it fills it completely on its entire length after insertion. At one axial end, the sleeve 11 has a stop 14, while it is provided with another stop in form of a connection lug 15 at the other axial end at which a connecting element 16 for a ground conductor 17 shown in FIG. 6 is fastened to. The stop 14 and the connection lug 15 extend transversely to the longitudinal axis 11*a* roughly in the middle of the sheath bottom and preferably consist of elements being formed to said shell 12, being made of the same material as the shell and being obtained by bending of extensions moulded to the sheath bottom by approximately 90°. The distance of the connection lug 15 from the stop 14 is as large as the width of the long-stator 1 in this direction, so that both of them abut the front and rear side thereof after assembly and the sleeve 11 is thereby fixed axially in a non-movable condition in the relevant groove 2.

The connecting element 16 is preferably comprised of a spring channel into which the ground conductor 17 can be pressed elastically and thereby undetachably fixed.

At both longitudinal ends and at the outer edges, i.e. at those points corresponding to the four corners if laid out in flat arrangement, the sleeve 11 has an inwardly protruding nominal contact point 18 each. Each nominal contact point 18 preferably consists of a bead and/or a bulge-shaped elevation which is radially arched inwardly according to FIG. 4 and FIG. 5 and which thereby entails a cross-sectional constriction of the shell 12.

The usual set-up of the winding 4 becomes evident from FIG. 6. Accordingly, the winding 4 comprises of a multi-stranded, electrically good-conducting core 19, a high-voltage insulating layer 20 surrounding it, and an outer sheath 21 wrapped around said layer 20 and made of a plastic material that has been made at least partially conductive, e.g. with carbon black or the like. Accordingly, both the insulating layer 20 and the sheath 21 are elastically resilient and/or can be compressed within certain limits.

The radial heights of the nominal contact points 18 are preferably so chosen that they dig themselves into the flexible sheath 21 after a winding 4 has been inserted. It is particularly advantageous to dimension the bead height in such a manner that this applies not only within the scope of usual tolerances, but even if the winding 4 and the sleeve 11 are slightly stretched or compressed radially due to temperature changes during summer and/or winter. Thereby, a seasonally independent constantly equally good contact between the sheath and the sleeve 11 is ensured.

Contact areas 18*a* (FIGS. 4, 5) of the nominal (desired) contact points 18 which cooperate with the sheath 21 of the winding 4 are preferably smooth and slightly arched, but by no means cornered or tapered. Besides, these contact areas 18*a* have a comparably large area, but nevertheless they are so dimensioned as to allow for a radial evasion of the sheath 21 if they act thereon. On the whole, it gives the advantage that the sleeve 11 in a mounted status according to FIG. 6 always lies planar and firmly with its nominal contact points at the sheath 21 of the winding 4. One consequence hereof is that defined contacts are thereby created for the transition of the electrical current from the sheath 21 to the terminal lug 15 and from there further on to the ground conductor 17 lying in the connecting element 16. Irrespective of tolerances and weather conditions, a defined discharge of the electric current through the ground conductor 17 is thus always assured.

The sleeve 11 is entirely made of a stainless steel metal sheet, to which the component parts 14, 15, 16, and 18 are moulded to, e.g. after a punching step by applying usual shaping steps.

According to FIG. 6, the connecting element 16 takes-up the ground conductor 17. To ensure that good contacts with little transition resistances are obtained here, too, the connection lugs 15 and spring channels 16 are of a large-area configuration. In particular, this applies with respect to the smaller flow cross-sections of these parts in comparison with the sleeve 11. Moreover, the present invention provides for producing the ground conductor 17 exclusively from a corrosion-resistant metal. Thereby, the problems occurring if as hitherto usual insulating layers are used, are avoided which problems occur in the area of sharp-edged contact points. Furthermore, the ground conductor 17 is advantageously made of the same material as the sleeve 11, i.e. from stainless steel, in order to preclude even those interferences like for instance contact corrosion that might occur in the area of the contact points due to the electrochemical contact series, if unfavourable metal combinations are used, e.g. Cu/Fe. Moreover it bears the advantage that stainless steel is corrosion-protection so that an additional corrosion-protection layer is not required. Instead of stainless steel, however, other corrosion-resistant materials, e.g. tin-coated copper, titanium or the like could also be used. Finally another advantage is that the current carrying capacity between the connecting element 16 and the ground conductor 17 is substantially greater due to the lack of an insulating layer.

Besides, the ground conductor 17 is expediently made of a stainless steel rope, even if it could also be configured as a massive rod.

Figure 7:
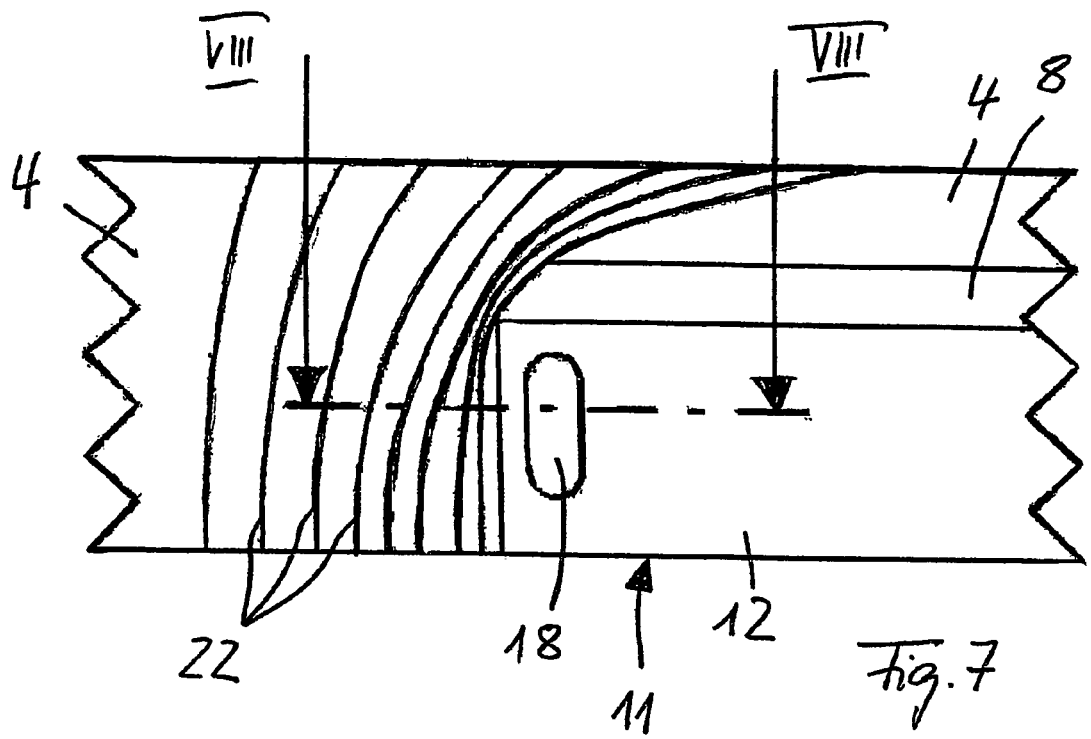
FIG. 7 shows a partial side view of the sleeve according to FIG. 3 with an inserted winding.
Figure 8:
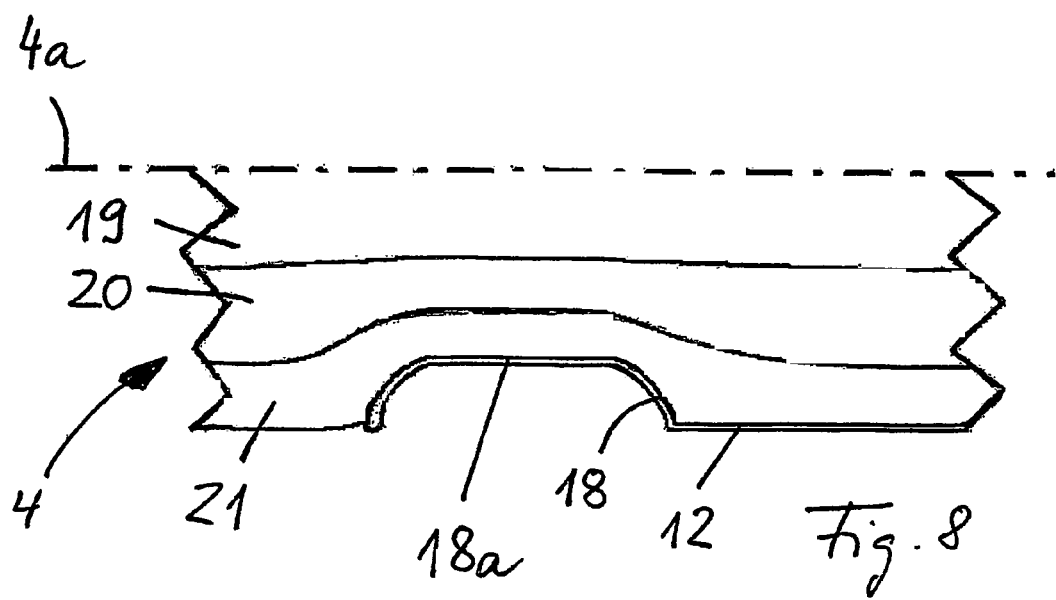
FIG. 8 shows a section along line VIII-VIII of FIG. 7.

FIG. 7 and FIG. 8 indicate the efficiency of the nominal contact points 18 according to the present invention. Accordingly, FIG. 7 shows a side view of a short piece of a winding 4 and an end section of a sleeve 11 adjoining it with one of the predetermined contact points 18. Equipotential lines are indicated by reference numeral 22 which develop in the winding 4 during operation and which are comparably slightly deformed in the area of the contact point 18 and by no means so much deformed as it would be the case if there were acute edges or the like. FIG. 8 shows something similar in a longitudinal section through a short piece of a winding 4 and a nominal contact point 18 pressed into its sheath 21, but in contrast with FIG. 7 only half of the winding 4 lying on one side of a central plane 4*a* is shown. From this view, too, it is evident that a very homogeneous distribution of the equipotential lines is obtained. This leads to the advantageous consequence that homogeneous distributions of electric current are obtained in the area of the selected contact points and that no critical electrical current densities are reached.

To ensure a proper function of the ground conductor 17 even in the area of a switch provided in the guideway of a magnetic levitation railway, the described device here is configured in conformity with FIG. 9 to FIG. 11. A problem appears because the distances between two long-stator sections 1*a*, 1*b* abutting each other may in the region of a switch vary by some millimeters due to a movement of the switch. The tension-proof ground conductor 17 cannot follow these changes. Therefore, forces are exerted through the ground conductor 17 onto the connecting elements 16 which may plastically deform thereby and also reduce the clamping action and as a result thereof also the size of the contact surfaces. This may ultimately lead to a failure of a contact between a sleeve 11 and the ground conductor 17 which is even speeded-up by oscillations and vibrations occurring during operation.

According to the present invention it is therefore provided to separate (divide) the ground conductor 17 in the area of critical joints between long-stator portions 1*a*, 1*b* and to protect the ends thus obtained from splicing-up by security means 23 of any kind. For example, tubular end pieces 23 drawn onto the obtained ends and then squeezed are suitable for this purpose. The ends of the ground conductor 17 thus obtained are connected to each other in form of a bridge by means of a flexible connecting piece 25 provided with a loop 24 and preferably made of the ground conductor material, wherein the connecting piece 25 is fastened at its ends by the aid of clamping connectors 26 to the two separated ends of the ground conductor 17. Accordingly, the loop 24 constitutes an elastic reserve portion of the ground conductor which may supply or take-up the material quantities required in case of changes in the distance of the long-stator portions 1*a*, 1*b*, without this causing any tensile stress for the actual ground conductor 17 or any excessive load for the connecting elements 16, etc.

According to FIG. 10 and FIG. 11, the clamping connectors 26 are for example made of two parts 26*a* and 26*b* being connectable by means of corrosion-resistant screws 27, said parts accommodating between them the connecting piece 25 on the one hand and the pertinent end of the ground conductor 17 on the other hand. Further, the one part (e.g. 26*b*) may be provided with an anti-twisting element 28 in form of a web or the like which is moulded to it and which lays itself in a mounted status against a side wall of the long-stator 1 and thus prevents undesirable twisting of the clamping connector 26.

Based upon these measures as outlined hereinabove it is achieved that the ground conductor 17 in the area of the switches is not overloaded and that the service life of the sleeves 11 in these areas is increased. Appropriate loops may also be mounted at other intersections between long-stator portions or ground conductor ends.

Finally, from FIG. 6, it becomes evident that every straight winding strand of the windings 4 lying between the winding heads is provided with a sleeve 11 inserted into a groove 2 not shown here. After insertion of the sleeves 11, the connecting elements and/or spring channels 16 lie coaxially one behind the other in order to jointly take-up the ground conductor 17 extending in the longitudinal direction of the guideway.

The invention is not limited to the described embodiment that can be diversified in a plurality of ways. In particular this applies to the number and shape of the nominal contact points 18 provided at a sleeve 11. Furthermore it would be possible to provide the sleeves 11 with second connecting elements 16 rather than with the stops 14 and to lay a ground conductor 17 each at both sides of the long-stator 1. Moreover, it is possible to choose a shape other than the one shown in FIG. 3 for the sleeves 11, particularly if the shape of the grooves 2 in long-stator 1 calls for this different shape. It would also be possible to provide the sleeves 11 in a two-part or multiple-part configuration. For example, one ground conductor 17 could be mounted on each side of the long-stator 1 and one part each of the sleeve provided with an connecting element 17 could be assigned to each of these ground conductors 17. In this case, the middle section of the sleeve 11 shown in FIG. 3 could be completely omitted. Besides it is clear that the invention also covers a magnetic levitation railway equipped with the devices as described hereinabove. Finally it is self-explanatory that the different features can also be applied in combinations other than those described and shown hereinabove

The invention claimed is:

1. A sleeve (11) for connecting an at least partially electrically conductive, elastically resilient sheath (21) of an alternating current winding (4), which is placed in a groove (2) of a long-stator (1), to a ground conductor (17), consisting of a shell-like, resilient element being made of an electrically conductive metal sheet and partly enclosing said winding (4) over more than a half of said winding in such a manner that said winding (4) is pressable into said sleeve (11) after said sleeve (11) has been placed in said groove (2), wherein said sleeve (11) has at least one inwardly protruding nominal contact-point (18) forming a contact-area (18*a*) which presses into said sheath (21) after said winding (4) has been placed into said sleeve (11) and a connecting element (16) for said ground conductor (17) positioned at least one longitudinal end, wherein said nominal contact-point (18) consists of a bulge-shaped elevation in the form of a bead having a smooth or slightly arched contact-area (18*a*).

2. A sleeve according to claim 1, further having two longitudinal ends and two of said nominal contact-areas (18*a*) at each of said ends, said nominal contact-areas (18*a*) being arranged at outer edges.

3. A device sleeve according to claim 1, wherein said bead has a radial height and is configured such that said bead radially presses itself into said sheath (21) of said winding (4) in the mounted condition thereof.

4. The sleeve according to claim 1, wherein said connecting element (16), a connection lug (15) connecting said element (16) with said sleeve (11), and said nominal contact point (18) have a large-area configuration to reduce transition resistances from said sheath (21) of said winding (4) to said sleeve (11) and from said sleeve (11) to said ground conductor (17).

5. The sleeve according to claim 4, wherein said connecting element (16) is connected to said sleeve (11) in a one-part configuration by means of said connection lug (15).

6. The sleeve according to claim 1, wherein said sleeve (11), said element (16) and said ground conductor (17) are made of stainless steel.

7. The sleeve according to claim 1, wherein said connecting element (16) is a spring channel configured for resilient accommodation of said ground conductor (17).

8. A magnetic levitation railway, comprising a long-stator (1) as a part of a long-stator linear motor and having grooves (2) and an alternating current winding (4) inserted into said grooves, wherein said winding (4) has an at least partially electrically conductive sheath (21), said railway including a device for grounding the sheath (21), said device comprising a sleeve (11) for connecting the sheath (21) of the alternating current winding (4), which is placed in a groove (2) of the long-stator (1), to a ground conductor (17), consisting of a shell-like, resilient element being made of an electrically conductive metal sheet and partly enclosing said winding (4) over more than a half of said winding in such a manner that said winding (4) is pressable into said sleeve (11) after said sleeve (11) has been placed in said groove (2), wherein said sleeve (11) has at least one inwardly protruding nominal contact-point (18) forming a contact-area (18a) which presses into said sheath (21) after said winding (4) has been placed into said sleeve (11) and a connecting element (16) for said ground conductor (17) positioned at least one longitudinal end, wherein said nominal contact-point (18) consists of a bulge-shaped elevation in the form of a bead having a smooth or slightly arched contact-area (18a).

* * * * *